United States Patent
Hirai

(10) Patent No.: US 8,052,160 B2
(45) Date of Patent: Nov. 8, 2011

(54) VEHICULAR SUSPENSION DEVICE

(75) Inventor: Hideki Hirai, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/450,534

(22) PCT Filed: Jul. 23, 2008

(86) PCT No.: PCT/JP2008/063609
§ 371 (c)(1),
(2), (4) Date: Sep. 29, 2009

(87) PCT Pub. No.: WO2009/014247
PCT Pub. Date: Jan. 29, 2009

(65) Prior Publication Data
US 2010/0117324 A1 May 13, 2010

(30) Foreign Application Priority Data
Jul. 24, 2007 (JP) ................................ 2007-191914

(51) Int. Cl.
*B60G 3/18* (2006.01)
(52) U.S. Cl. ... 280/124.135; 280/124.137; 280/124.138; 280/124.149; 280/124.15
(58) Field of Classification Search .......... 280/124.135, 280/124.136, 124.137, 124.15, 124.138, 280/124.139, 124.143, 124.149
See application file for complete search history.

(56) References Cited

U.S. PATENT DOCUMENTS

| | | | |
|---|---|---|---|
| 5,895,063 A | 4/1999 | Hasshi et al. | |
| 6,079,722 A | 6/2000 | Kato et al. | |
| 6,764,084 B1 * | 7/2004 | Nakamura et al. | 280/93.512 |
| 7,798,507 B2 * | 9/2010 | Hirai | 280/124.135 |

FOREIGN PATENT DOCUMENTS

| | | |
|---|---|---|
| DE | 197 51 754 A 1 | 5/1999 |
| JP | 62-174909 | 11/1987 |
| JP | 03-109173 | 5/1991 |
| JP | 07-186680 | 7/1995 |
| JP | 09-263116 A | 10/1997 |
| JP | 10-264628 A | 10/1998 |
| JP | 2000-153705 A | 6/2000 |
| JP | 2006-143013 | 6/2006 |
| JP | 2006-182174 | 7/2006 |

* cited by examiner

*Primary Examiner* — Eric Culbreth
(74) *Attorney, Agent, or Firm* — Carrier Blackman & Associates, P.C.; Joseph P. Carrier; William D. Blackman

(57) ABSTRACT

A suspension apparatus is disclosed for which vehicle handling stability can be obtained. An upper arm (14), a damper unit (16), and a stabilizer (17) are connected in this order to a knuckle (13) from outside of the vehicle body in a width direction of the vehicle body. The reaction force of the stabilizer is used as a moment in the camber direction, and causes interference in the camber direction. As a result, a camber change during a reverse phase stroke is increased over a camber change during a same-phase stroke, and turning performance of the vehicle is improved.

3 Claims, 7 Drawing Sheets

VEHICULAR SUSPENSION DEVICE

TECHNICAL FIELD

The present invention relates to a vehicle suspension apparatus for allowing a wheel to move up and down in a stroke to soften an input from a road surface and keep the vehicle stable.

BACKGROUND ART

Double-wishbone and multilink suspension apparatuses are known as vehicle suspension apparatuses.

These types of suspension apparatuses have been widely adopted with design modifications to the suspension according to different applications.

Known as these vehicle suspension apparatuses are those in which a knuckle is supported with a damper unit, those in which input from a stabilizer is introduced into a lower arm, and those in which input from a stabilizer is introduced into an upper arm (for example, Japanese Patent Application Laid-Open Publication Nos. 2006-143013, 2000-153705 and 2006-182174).

FIG. 8 hereof shows the suspension apparatus disclosed in Japanese Patent Application Laid-Open Publication No. 2006-143013.

In a suspension apparatus 230, a damper unit (shock absorber) 231 is supported close to the knuckle, and the damper unit 231, which also doubles as a strut, has a fulcrum 234 for a link which extends to a stabilizer 233.

FIG. 9 shows the suspension apparatus disclosed in Japanese Patent Application Laid-Open Publication No. 2000-153705.

A suspension apparatus 240 is configured with the lower edge of a strut member 242 having a damper unit (shock absorber) 241 as a two-pronged fork 243. Each of these fork prongs 243 is coupled to a lower arm (lower link member) 244, and the edge of a stabilizer 245 on a wheel 246 is coupled to the lower arm 244 through the gap between the two fork prongs 243.

FIG. 10 shows the suspension apparatus disclosed in Japanese Patent Application Laid-Open Publication No. 2006-182174.

A suspension apparatus 250 has a knuckle 252 for rotatably supporting a wheel 251, an upper arm 253 for swingably coupling the upper portion of the knuckle 252 with the vehicle body, a lower arm 254 for swingably coupling the lower portion of the knuckle 252 with the vehicle body, a damper unit 255 extending between the lower arm 254 on the side of the knuckle 252 and the vehicle body, and a stabilizer 256 whose input is introduced into the upper arm 253.

For example, in a suspension system in which an A-shaped arm is used for the upper arm, and a damper unit whose spring is coaxial with the damper is mounted on the knuckle, as with the suspension apparatus shown in FIG. 8, there are numerous cases in which the stabilizer is attached to the lower arm, as in the suspension apparatus shown in FIG. 9, or in which the stabilizer is attached to the upper arm, as in the suspension apparatus shown in FIG. 10.

In a case in which the stabilizer is attached to the lower arm, it is sometimes difficult to introduce input from the stabilizer into the knuckle on the lower arm, the purpose of which is to avoid interference from the upper arm and damper, and the like. Here, when the ratio between the distance from the knuckle on the lower arm to the input point of the stabilizer and the distance from the input point of the stabilizer to the vehicle body side of the lower arm is designated as a lever ratio, the lever ratio deteriorates with increased distance from the knuckle on the lower arm to the input point of the stabilizer, and sometimes the action of the stabilizer cannot be adequately performed. Specifically, it is impossible to assure favorable handling stability.

In addition, in a case in which the stabilizer is attached to the upper arm, sometimes the input point must be offset forward or backward in relation to the axis (wheel center) in order to avoid interference from the lower arm, the damper unit, or the like. When the input point is offset forward or backward in relation to the axis, a mode occurs in which the knuckle itself is rotated, and unnecessary toe change occurs. Specifically, it is impossible to assure favorable handling stability.

DISCLOSURE OF THE INVENTION

An object of the present invention is to provide a vehicle suspension apparatus capable of achieving both high toe rigidity and ideal camber angle change and assuring favorable handling stability during a turn in a suspension system in which a damper unit is supported by a knuckle and in which an input from a stabilizer is introduced into a lower arm or an upper arm.

According to one aspect of the present invention, there is provided a vehicle suspension apparatus which comprises: a knuckle adapted for attachment of a wheel thereto; an upper arm and a lower arm for swingably supporting the knuckle, the arms being interposed between the knuckle and a vehicle body; a stabilizer for stabilizing the vehicle body, a tip of the stabilizer being attached to the knuckle so as to be supported by the vehicle body; and a damper unit for softening shocks to the vehicle body, the unit being interposed between the vehicle body and the knuckle, wherein the upper arm, the damper unit, and the stabilizer are connected in this order to the knuckle from outside the vehicle body transversely of the latter.

Connecting the upper arm, the damper unit, and the stabilizer in this order to the knuckle from outside of the vehicle body in a width direction of the vehicle body in this manner makes it possible to actively use the reaction force of the stabilizer as a moment in a camber direction and to create interference in the camber direction. It is thereby possible to make the camber change during a reverse-phase stroke greater than the camber change during a same-phase stroke. As a result, it is possible to improve handling stability (equivalent CP) during turning, and turning performance is improved as well. As used herein, "equivalent CP" is a term whereby the effect on the force generated in a tire in a transverse direction on a contact surface of the tire is substituted with cornering power (CP) in an equivalent manner.

The upper arm, the damper unit, and the stabilizer are preferably connected to the knuckle at substantially the same height in a height direction of the vehicle body in proximity to the axis of the wheel. Consequently, it is possible to reduce rotation around the axis of the knuckle due to the reaction force of the damper unit and the reaction force of the stabilizer, and to reduce the toe change of the wheel. Also, it is possible to reduce the moment applied to the knuckle by the reaction force of the damper unit and the reaction force of the stabilizer around a virtual kingpin axis by setting the input point of the damper unit and the stabilizer close to the virtual kingpin axis. It is thereby possible to reduce the toe change of the wheel. Based on the foregoing, it is possible to provide both high toe rigidity and ideal camber angle change during a turn, and favorable handling stability is assured.

The upper arm preferably has a single A-shaped arm disposed above the center of the wheel, and the lower arm is composed of three I-shaped arms disposed below the center of the wheel. Consequently, it is possible to create an arm configuration for a common multilink suspension. As a result, it is possible to expand the degree of freedom in designing a vehicle suspension apparatus.

BEST MODE FOR CARRYING OUT THE INVENTION

Figure 1:
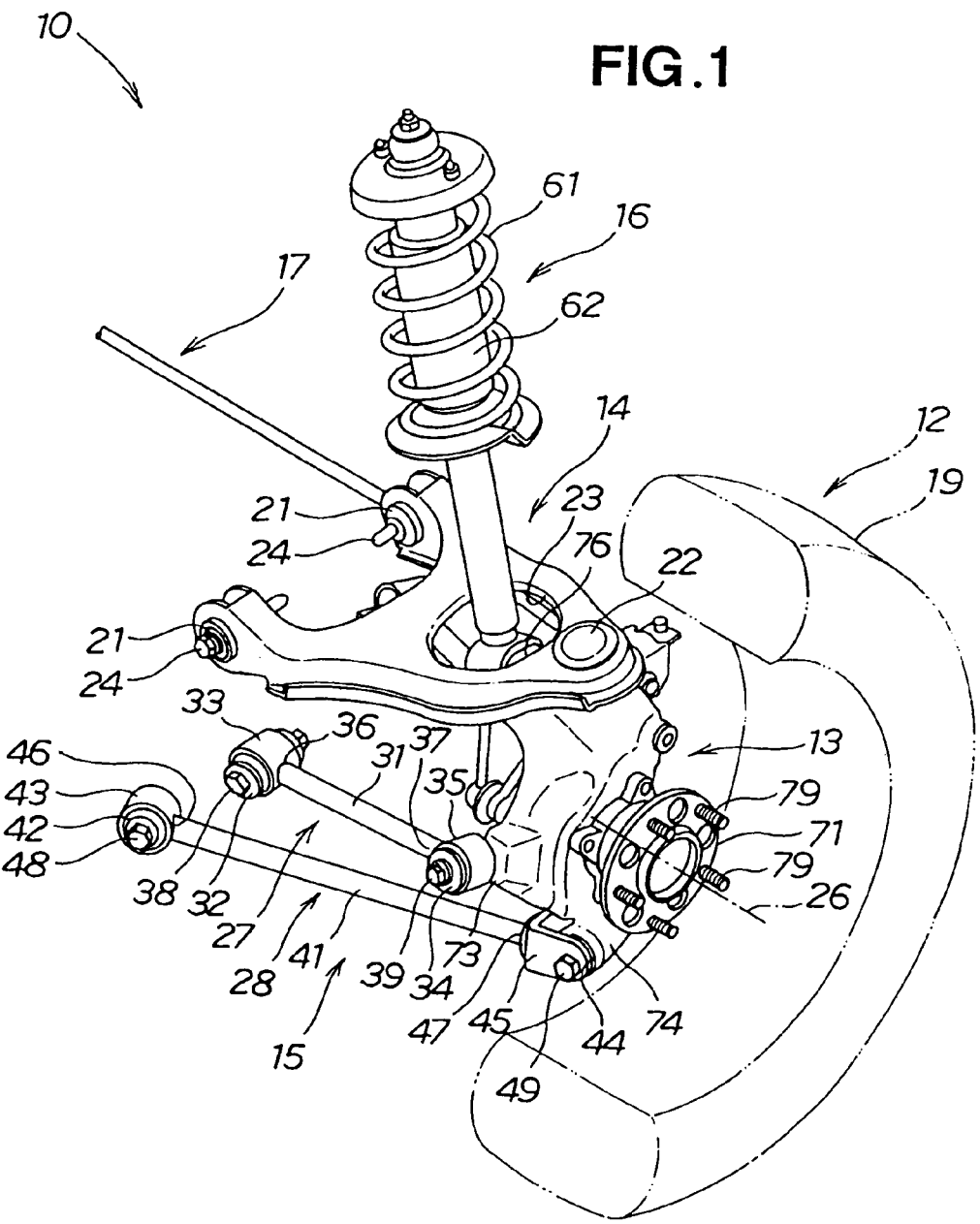
FIG. 1 is a perspective view showing a vehicle suspension apparatus according to the present invention, as viewed from the rear of a vehicle.
Figure 2:
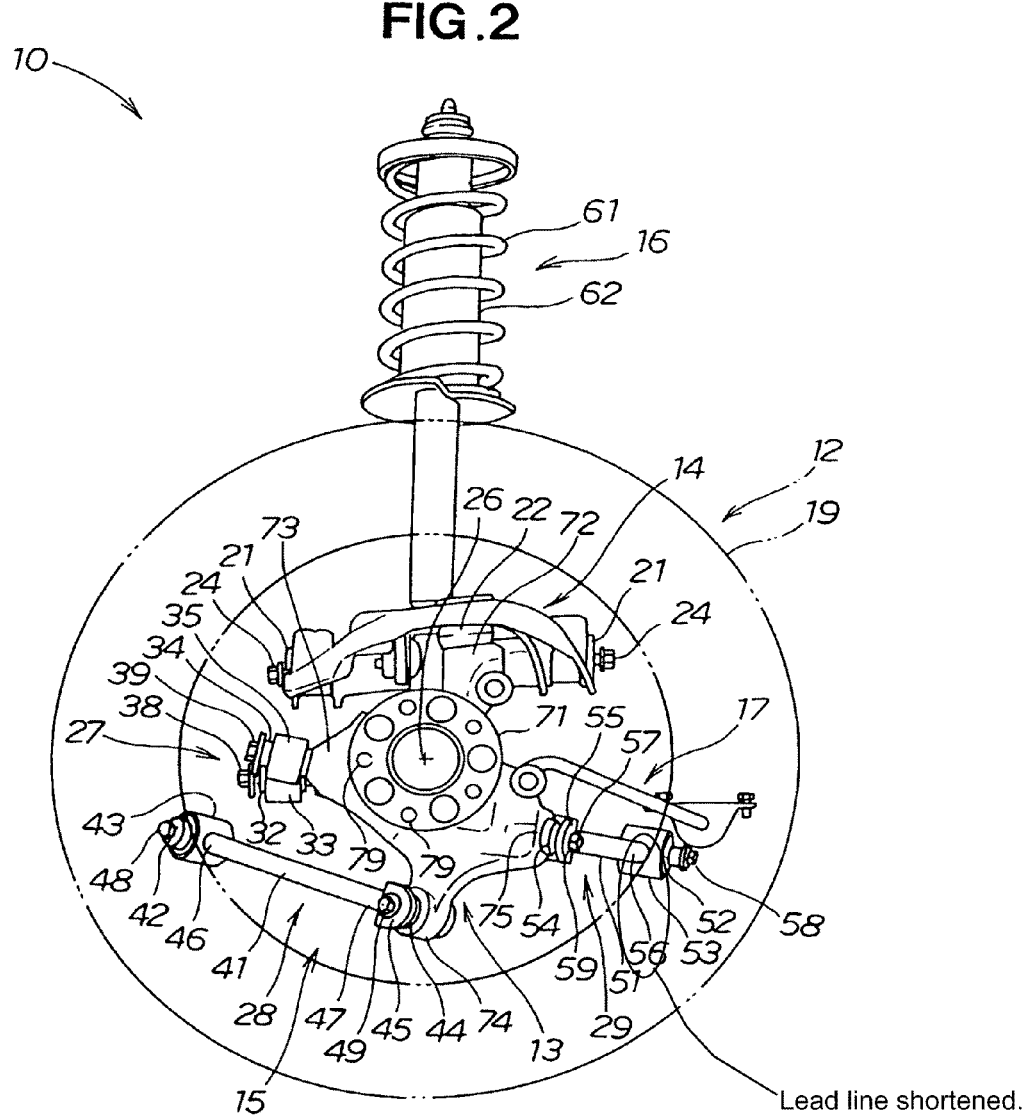
FIG. 2 is a side elevational view of the suspension apparatus of FIG. 1.
Figure 3:
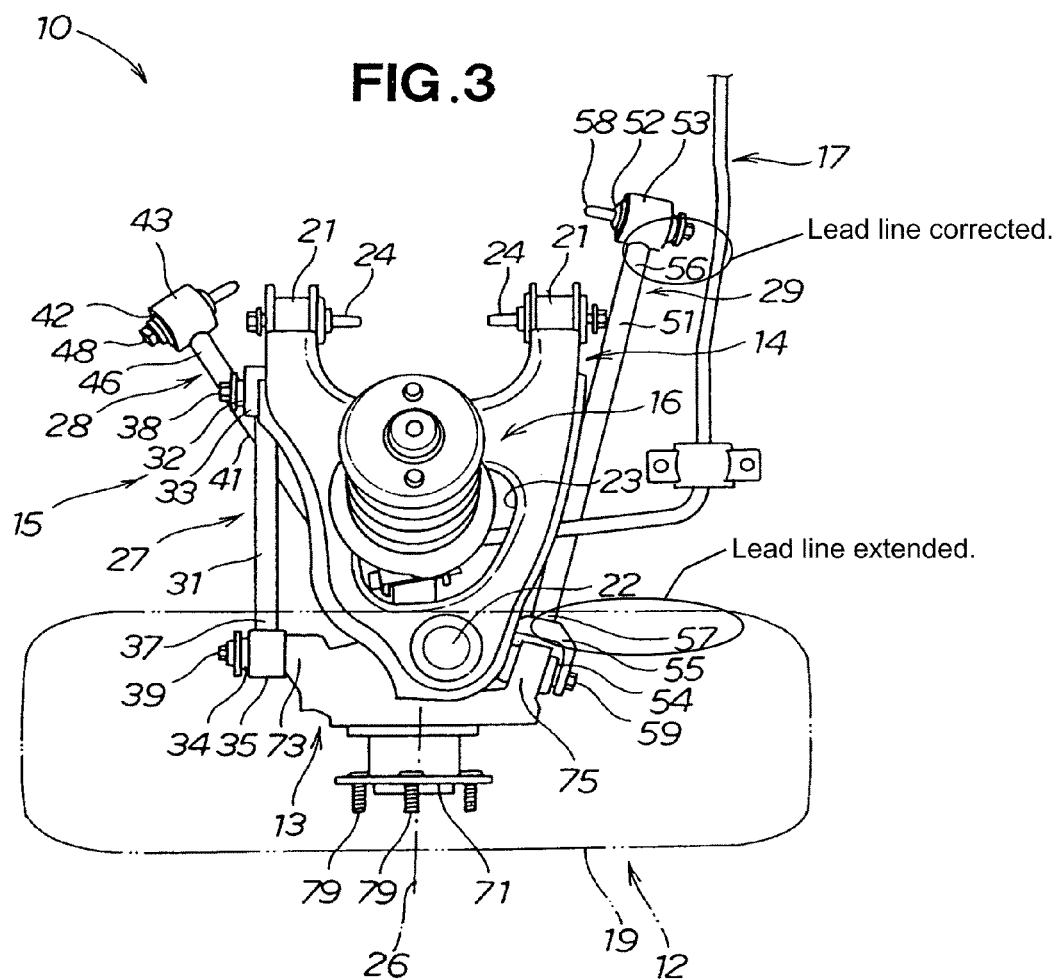
FIG. 3 is a plan view showing the suspension apparatus of FIG. 1.
Figure 4:
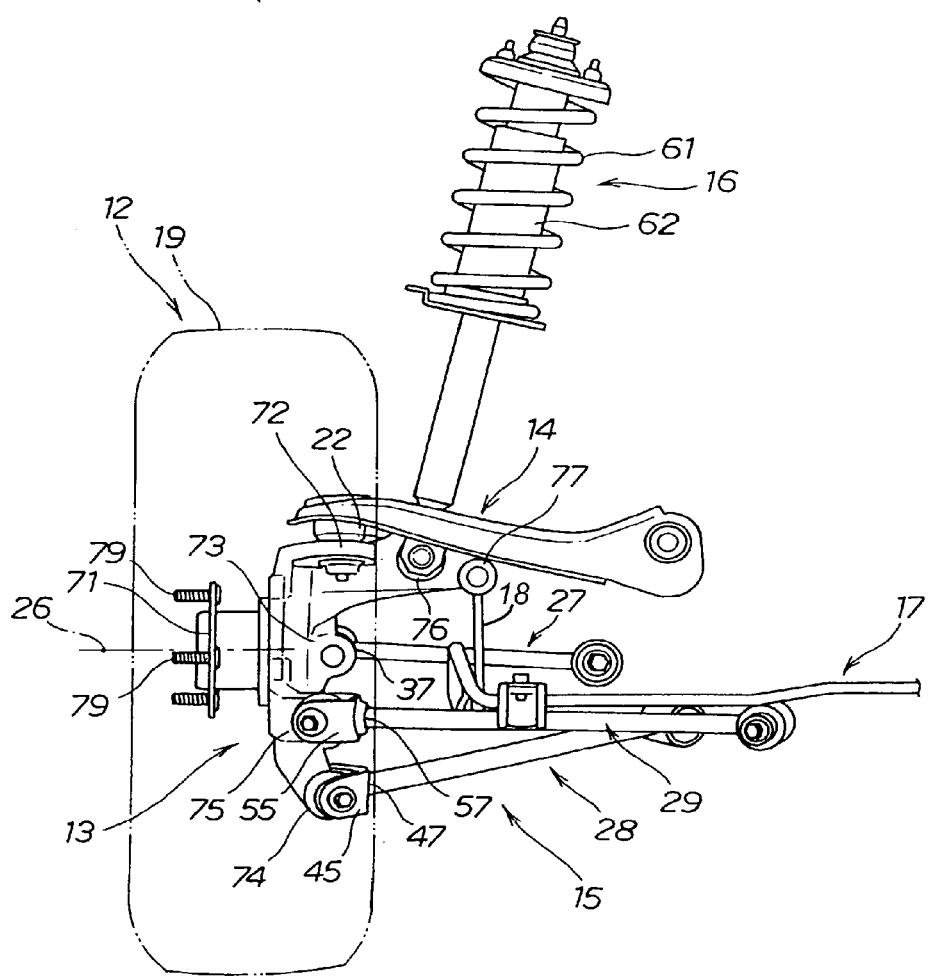
FIG. 4 is a schematic front elevational view showing the suspension apparatus of FIG. 1, as applied to the vehicle.

As shown in FIGS. 1 to 4, the vehicle suspension apparatus 10 is a rear suspension for a right rear wheel (vehicle wheel) 12. The apparatus has a knuckle 13 to which the wheel 12 is attached in a freely rotating manner, an upper arm 14 extending from the inner side of the vehicle body outward widthwise relative to the vehicle body and supporting the upper portion of the knuckle 13, a lower arm 15 extending from the inner side of the vehicle body outward widthwise relative to the vehicle body and supporting the lower portion of the knuckle 13, a damper unit (shock absorber) 16 extending between the vehicle body and the upper portion of the knuckle 13 and softening shocks input from the wheel 12, and a stabilizer 17 extending between the vehicle body and the upper portion of the knuckle 13 and stabilizing the vehicle body. As shown in FIG. 4, the stabilizer 17 is operatively connected to the knuckle 13 via a substantially vertically oriented linking member 18 extending therebetween.

The wheel 12 is composed of a wheel rim (not shown) attached to the knuckle 13, and a tire 19 attached to the wheel rim.

The upper arm 14 is substantially an A-shaped arm, and has front and rear rubber bushing joints 21, 21 formed at the lower edge of the substantial A-shape and swingably attached to the vehicle body, a rubber bushing joint 22 formed at the apex of the substantial A-shape and swingably supporting the upper portion of the knuckle 13, and an aperture 23 formed in the hollow center portion of the substantial A-shape and through which the damper unit 16 passes.

The front and rear rubber bushing joints 21, 21 are attached to the vehicle body by bolts 24, 24.

The lower arm 15 is composed of a first lower arm (lateral rod) 27 extending from the vehicle body outward widthwise relative to the vehicle body and supporting a height position of the axis 26 (center of the wheel 12) at the front edge of the knuckle 13, a second lower arm (lateral rod) 28 extending from the vehicle body outward widthwise relative to the vehicle body and supporting a downward position of the axis in proximity to the center of the knuckle 13, and a third lower arm (lateral rod) 29 extending from the vehicle body outward widthwise relative to the vehicle body and supporting a downward position of the axis at the rear edge of the knuckle 13.

The first through third lower arms 27 to 29 are substantially I-shaped arms, each having components joined by welding as described below, and the respective outer ends of these arms are disposed in order from the front to the rear of the vehicle body as the first lower arm 27, the second lower arm 28, and the third lower arm 29, as shown in FIG. 3.

In addition, the first through third lower arms 27 to 29 are extended left and right (in a width direction of the vehicle).

The first lower arm (arm) 27 is composed of an I-shaped arm unit (rod) 31, a vehicle body-side annular unit 33 welded to one tip of the arm unit 31 and supported on the vehicle body side via a first rubber bushing (rubber bushing joint) 32, and a knuckle-side annular unit 35 welded to the other tip of the arm unit 31 and supported on the knuckle side via a second rubber bushing (rubber bushing joint) 34.

Specifically, the first lower arm 27 has a welded structural component 36 on one tip of the arm unit 31, and a welded structural component 37 on the other tip of the arm unit 31. Furthermore, the lower arm 27 is connected to the front side of the knuckle 13.

The first rubber bushing 32 is attached to the vehicle body by a bolt 38, and the second rubber bushing 34 is attached to the knuckle 13 by a bolt 39.

A prescribed inclination angle is imparted between the center lines of the first and second rubber bushings 32, 34 when the first and second rubber bushings 32, 34 are viewed from the axial direction of the arm unit 31. The inclination angle between the center lines is preferably set to from 5 to 20 degrees.

The second lower arm 28 is composed of a rod 41, a vehicle body-side annular unit 43 welded to one tip of the rod 41 and supported on the vehicle body via a rubber bushing joint 42, and a knuckle-side joint unit 45 welded to the other tip of the rod 41 and attached to the knuckle 13 via a rubber bushing joint 44.

Specifically, the second lower arm 28 has a welded structural component 46 on one tip of the rod 41, and a welded structural component 47 on the other tip of the rod 41.

The rubber bushing joint 42 is attached to the vehicle body by a bolt 48, and the knuckle-side joint unit 45 is attached to the knuckle 13 by a bolt 49.

The third lower arm 29 is composed of a rod 51, a vehicle body-side annular unit 53 welded to one tip of the rod 51 and supported on the vehicle body by a rubber bushing joint 52, and a knuckle-side joint unit 55 welded to the other tip of the rod 51 and attached to the knuckle 13 via a rubber bushing joint 54.

Specifically, the third lower arm 29 has a welded structural component 56 on one tip of the rod 51, and a welded structural component 57 on the other tip of the rod 51.

The rubber bushing joint 52 is attached to the vehicle body by a bolt 58, and the knuckle-side joint unit 55 is attached to the knuckle 13 by a bolt 59.

As shown in FIG. 4, the welded structural components 37, 47, 57 of the first through third lower arms 27 to 29 on the side of the knuckle 13 are disposed so as to be housed within the tire 19.

The damper unit 16 is composed of a coil spring 61 for absorbing shocks input from the tire 19 (for softening shocks to the vehicle body), and a damper 62 extending between the vehicle body and the knuckle 13, the damper acting to soften the movement of the coil spring 61. The coil spring 61 is disposed on the outer perimeter and coaxially to the damper 62.

The knuckle 13 has a wheel attachment unit 71 for attaching the wheel rim (not shown), an upper arm support unit 72 formed above the axis 26 and supported by the upper arm 14, a first lower arm support unit 73 formed in front of the axis 26 and supported by the first lower arm 27, a second lower arm support unit 74 formed underneath the axis 26 and supported by the second lower arm 28, a third lower arm support unit 75 formed below and to the rear of the axis 26 and supported by the third lower arm 29, a damper unit link 76 formed above the axis 26 and linked to the damper unit 16, and a stabilizer link 77 formed above and to the rear of the axis 26 and linked to the stabilizer 17.

The wheel attachment unit 71 has a plurality of bolts 79 for fastening the wheel rim with nuts.

As shown in FIG. 4, the upper arm support unit 72, the damper unit link 76, and the stabilizer link 77 are disposed in this order from outside of the vehicle body in the width direction of the vehicle. Specifically, these units are connected to the knuckle 13 in the order of the upper arm 14, the damper unit 16, and the stabilizer 17, from outside of the vehicle body in the direction of the vehicle body.

In addition, as shown in FIG. 4, the upper arm support unit 72, the damper unit link 76, and the stabilizer link 77 are disposed in proximity to the axis 26. Specifically, as viewed in a lateral view, the upper arm 14, the damper unit 16, and the stabilizer 17 are connected to the knuckle 13 at substantially the same height in the height direction of the vehicle body and in proximity to the axis 26 of the wheel 12.

The stabilizer 17 is a member interposed between the left and right rear wheels 12 (left rear wheel not shown). For example, in a case in which the left and right rear wheels 12 move up and down in phase, the stabilizer does not function as a spring, but when the left and right rear wheels 12 move in reverse phase (for instance, when the vehicle body sways laterally on a curve or the like), twisting occurs in a bar near the center, torsional rigidity creates resistance, and upward movement of the wheels to become airborne is restrained. As a result, tilting of the vehicle body is suppressed, and the vehicle body becomes more stable.

Figure 5:
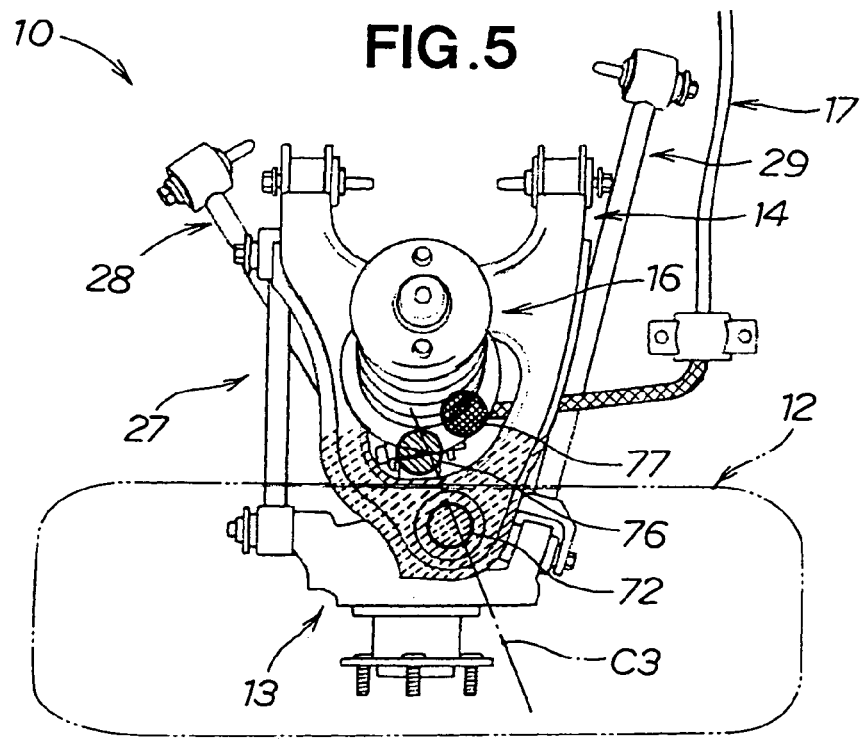
FIG. 5 is a schematic top plan view showing a knuckle support/coupling position on the suspension apparatus of FIG. 1.
Figure 7:
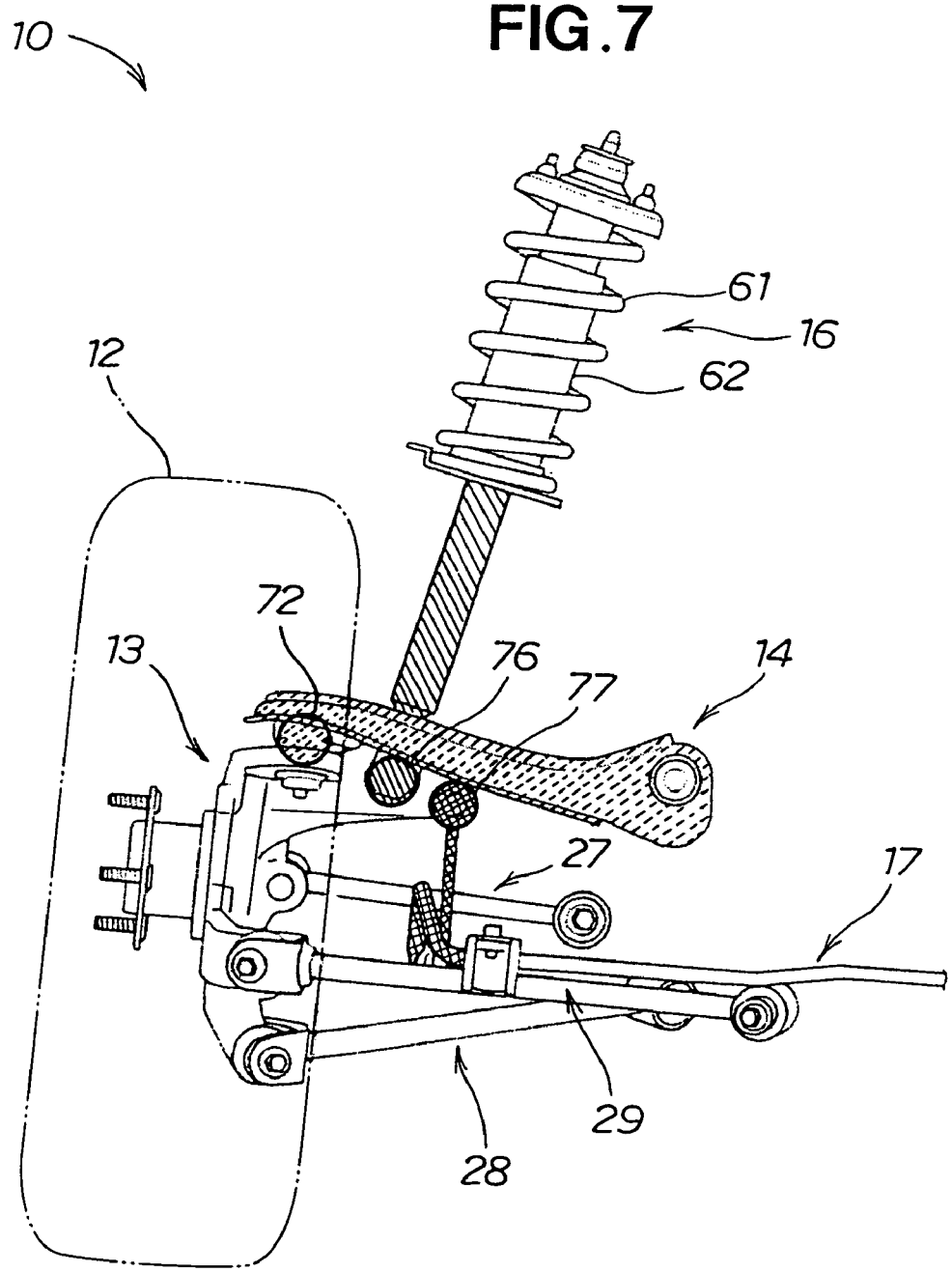
FIG. 7 is a schematic front elevational view showing the knuckle support/coupling location on the suspension apparatus of FIG. 1.
Figure 8:
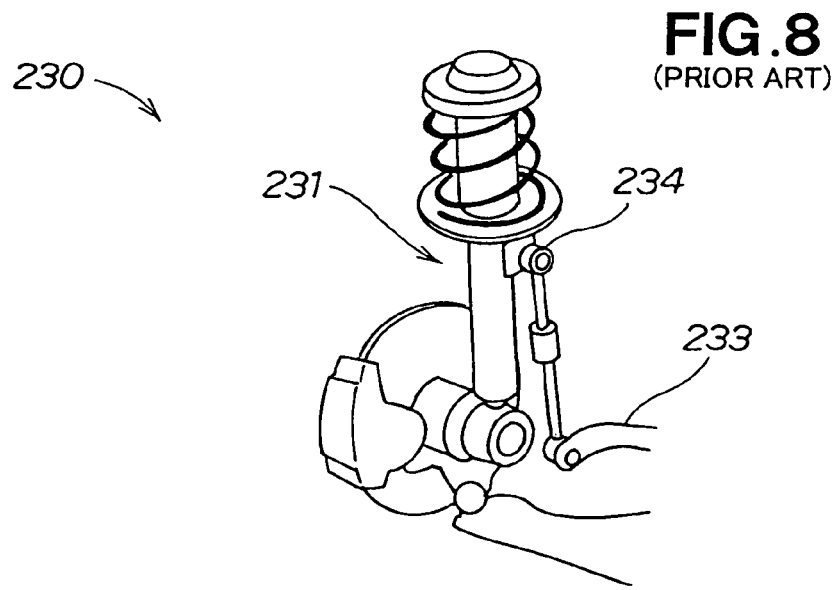
FIG. 8 is a schematic view showing a first conventional suspension apparatus.
Figure 9:
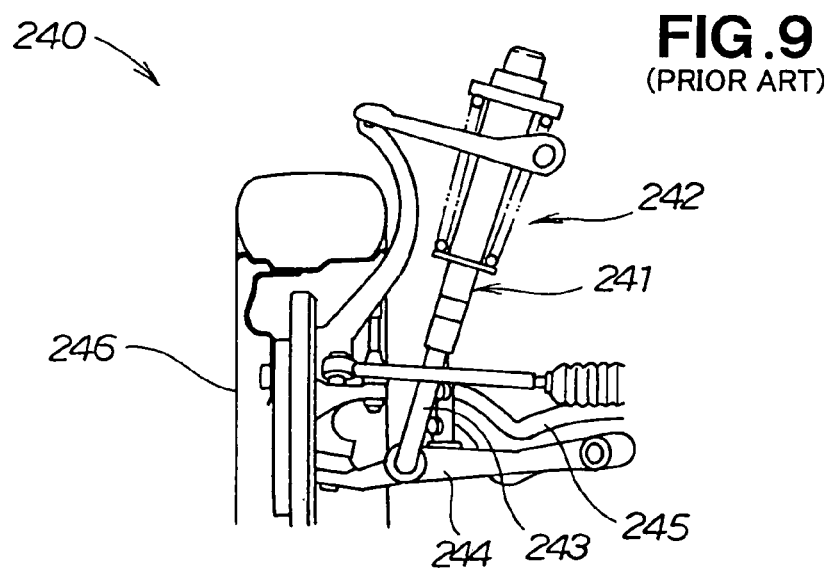
FIG. 9 is a schematic view showing a second conventional suspension apparatus.
Figure 10:
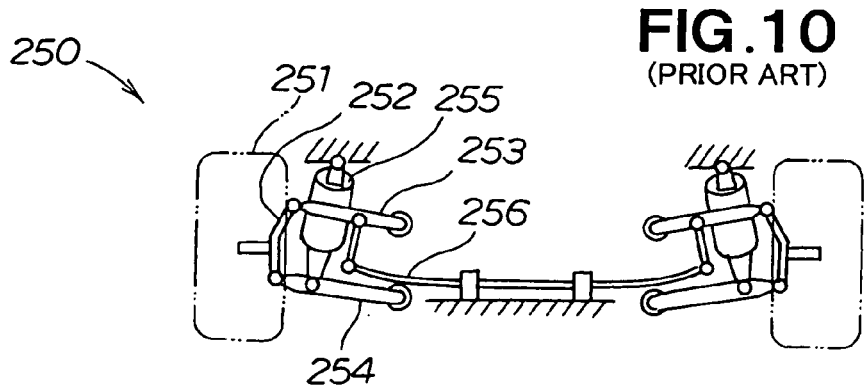
FIG. 10 is a schematic view showing a third conventional suspension apparatus.

As shown in FIGS. 5 and 7, the upper arm support unit 72, the damper unit link 76, and the stabilizer link 77 are disposed on the knuckle 13 in this order from outside of the vehicle body in the width direction of the vehicle. Specifically, the units are connected to the knuckle 13 in the order of the upper arm 14, the damper unit 16, and the stabilizer 17 from outside of the vehicle body in relation to the width direction of the vehicle.

Specifically, the vehicle suspension apparatus 10 of the present embodiment is composed of a knuckle 13 to which a wheel 12 is attached; an upper arm 14 and lower arms 27 to 29 for swingably supporting the knuckle 13; a stabilizer 17 for stabilizing the vehicle body; and a damper unit 16 for softening shocks to the vehicle body. The damper unit 16 has a structure in which a damper 62 and a spring 61 are disposed coaxially.

The upper arm 14, damper unit 16, and stabilizer 17 are connected in this order to the knuckle 13 from outside of the vehicle body in a width direction of the vehicle, whereby the reaction force of the stabilizer 17 is actively used as a moment in a camber direction, and interference is created in the camber direction. It is thereby possible to make the camber change during a reverse-phase stroke greater than the camber change during a same-phase stroke. As a result, it is possible to improve handling stability during turning, and turning performance is improved as well.

Figure 6:
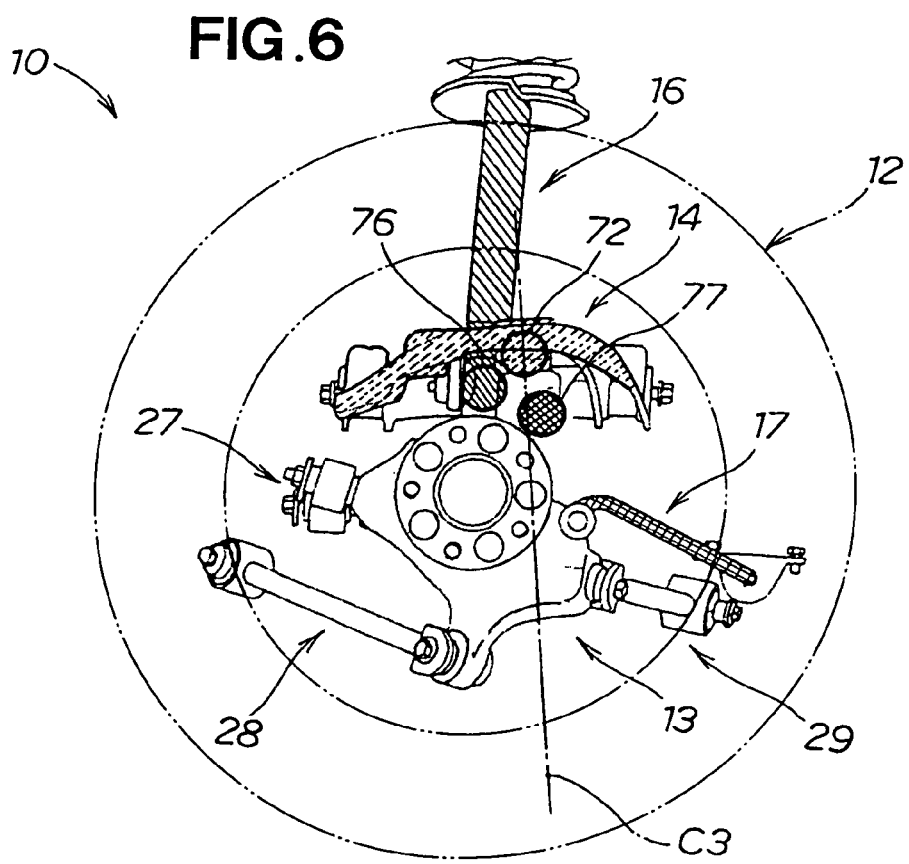
FIG. 6 is a schematic side elevational view showing the knuckle support/coupling position on the suspension apparatus of FIG. 1.

Moreover, as shown in FIG. 6, the upper arm support unit 72, the damper unit link 76, and the stabilizer link 77 are disposed in proximity to the axis 26. Specifically, in a lateral view, the upper arm 14, the damper unit 16, and the stabilizer 17 are connected to the knuckle 13 at substantially the same height in the height direction of the vehicle body in proximity to the axis 26 of the wheel 12.

Specifically, with the suspension apparatus 10 of the present embodiment, connecting the upper arm 14, the damper unit 16, and the stabilizer 17 to the knuckle 13 at substantially the same height in the height direction of the vehicle body and in proximity to the axis 26 of the wheel 12 makes it possible to reduce rotation of the knuckle 13 around the axis 26 due to the reaction force of the damper unit 16 and the reaction force of the stabilizer 17, and to reduce the toe change in the wheel 12.

It is possible to reduce the moment applied to the knuckle 13 by the reaction force of the damper unit 16 and the reaction force of the stabilizer 17 around a virtual kingpin axis C3 by placing the input points of the damper unit 16 and the stabilizer 17 in proximity to the virtual kingpin axis C3. As a result, the toe change of the wheel 12 can be reduced.

Based on the foregoing, it is possible to achieve both high toe rigidity and ideal camber angle change during turning of a vehicle, and to assure favorable handling stability.

In the suspension apparatus 10 of the present embodiment, configuring the upper arm 14 as a single A-shaped arm disposed above the center of the wheel 12, and configuring the lower arms 27 to 29 as three I-shaped arms disposed below the center of the wheel 12 make it possible to create an arm configuration for a common multilink suspension. As a result, it is possible to expand the degree of freedom in designing the suspension apparatus 10.

As shown in FIG. 4, the suspension apparatus 10 of the present invention is a suspension for the right rear wheel 12. However, the present invention is not limited to this option alone and may also be used as a suspension for a left rear wheel or a front wheel.

INDUSTRIAL APPLICABILITY

The vehicle suspension apparatus according to the present invention is useful particularly in a sedan, station wagon, or other passenger car.

The invention claimed is:

1. A vehicle suspension apparatus comprising:
a knuckle designed for attachment of a wheel thereto, the knuckle having an extension portion extending inwardly in a vehicle width direction and disposed above a central axis of the wheel;
an upper arm and a plurality of lower arms for swingably supporting the knuckle, the arms being interposed between the knuckle and a vehicle body;
a stabilizer for stabilizing the vehicle body, a tip of the stabilizer being operatively attached to the knuckle, the stabilizer configured and arranged so as to be supported by the vehicle body; and a damper unit for softening shocks to the vehicle body, the damper unit being interposed between the vehicle body and the knuckle;

wherein the upper arm, the damper unit, and the stabilizer are connected in this order to the knuckle from outside the vehicle body towards the vehicle body in the vehicle width direction;

wherein the damper unit and the stabilizer are connected in order to the extension portion of the knuckle from outside the vehicle body towards the vehicle body; and wherein a point of connection of the damper unit to the knuckle and a point of connection of the stabilizer to the knuckle are disposed one behind the other with a virtual kingpin disposed therebetween in a front-and-rear direction of the vehicle when the vehicle suspension apparatus is viewed in side elevation.

2. The vehicle suspension apparatus of claim 1, wherein the upper arm, the damper unit, and the stabilizer are connected to the knuckle at respective points which are disposed proximate one another in a height direction of the vehicle body, and in proximity to an axis of the wheel.

3. The vehicle suspension apparatus of claim 1, wherein the upper arm comprises a single A-shaped arm disposed above the central axis of the wheel and having an aperture formed therein, and the plurality of lower arms comprises three I-shaped arms disposed below the central axis of the wheel.

* * * * *